United States Patent [19]

Holm

[11] 4,141,416
[45] Feb. 27, 1979

[54] ENHANCED OIL RECOVERY USING ALKALINE SODIUM SILICATE SOLUTIONS

[75] Inventor: LeRoy W. Holm, Fullerton, Calif.

[73] Assignee: Union Oil Company of California, Brea, Calif.

[21] Appl. No.: 837,042

[22] Filed: Sep. 27, 1977

Related U.S. Application Data

[63] Continuation-in-part of Ser. No. 689,199, May 26, 1976, Pat. No. 4,081,029.

[51] Int. Cl.² ............................................. E21B 43/22
[52] U.S. Cl. ................................... 166/270; 166/273; 166/274; 166/275
[58] Field of Search ..................... 166/270, 273–275, 166/305 R

[56] References Cited

U.S. PATENT DOCUMENTS

| | | | |
|---|---|---|---|
| 2,920,041 | 1/1960 | Meadors | 166/275 |
| 3,087,539 | 4/1963 | Maurer, Jr. | 166/275 X |
| 3,500,921 | 3/1970 | Abrams et al. | 166/273 |
| 3,805,893 | 4/1974 | Sarem | 166/270 |
| 3,871,452 | 3/1975 | Sarem | 166/270 |
| 3,871,453 | 3/1975 | Sarem | 166/270 |
| 3,876,002 | 4/1975 | Sarem | 166/274 |
| 3,920,074 | 11/1975 | Sarem | 166/274 |
| 3,927,716 | 12/1975 | Burdyn et al. | 166/270 |
| 4,011,908 | 3/1977 | Holm | 166/273 |

Primary Examiner—Stephen J. Novosad
Assistant Examiner—George A. Suchfield
Attorney, Agent, or Firm—Richard C. Hartman; Dean Sandford; Gerald L. Floyd

[57] ABSTRACT

An enhanced oil recovery process for subterranean reservoirs wherein there is injected into the reservoir a relatively large slug of a dilute aqueous alkali metal silicate solution. It is optional to follow the silicate solution with an aqueous drive fluid. In treating heterogeneous reservoirs, it is further optional, prior to injecting the large slug of silicate solution, to inject one or more small slugs of the silicate solution alternately with one or more small slugs of a dilute aqueous solution of an agent that reacts with the alkali metal silicate to form a gelatinous precipitate. In the latter instance a small spacer slug of water is injected between successive slugs of the reactant solutions to separate the reactants during injection. It is still another option to precede the injection of the large slug of dilute aqueous alkali metal silicate solution with the injection of a slug of an aqueous solution of an alkali metal or ammonium salt selected from the group consisting of chloride, bromide, iodide and nitrate salts and admixtures thereof.

20 Claims, 2 Drawing Figures

ENHANCED OIL RECOVERY USING ALKALINE SODIUM SILICATE SOLUTIONS

CROSS-REFERENCE TO RELATED APPLICATION

This is a Continuation-in-Part of copending application, Ser. No. 689,199, filed May 26, 1976 now U.S. Pat. No. 4,081,029.

BACKGROUND OF THE INVENTION (a) Field of the Invention

This invention relates to the recovery of petroleum from subterranean reservoirs, and more particularly, to an enhanced oil recovery process especially suitable for heterogeneous reservoirs.

(b) Description of the Prior Art

It has long been recognized that substantial amounts of oil remain unrecovered at the completion of normal primary recovery operations. In order to improve the recovery of oil, it is common practice to supplement the native reservoir energy by various enhanced recovery means including the use of various aqueous fluids to displace oil from a formation.

It is known to use small slugs of a dilute aqueous alkaline alkali metal silicate solution in various enhanced oil recovery processes. U.S. Pat. Nos. 3,805,893 issued Apr. 23, 1974 and 3,871,452 and 3,871,453 issued Mar. 18, 1975 involve, in part, injection into a subterranean petroleum reservoir of small slugs of a dilute aqueous solution containing from about 0.1 to 0.8 weight percent of an alkaline alkali metal silicate having a molar ratio of $M_2O/SiO_2$ of 1 or above, wherein M is an alkali metal atom. It is suggested that the solution be injected for from 1 hours to 7 days at a rate of from 100 to 2,000 barrels per day per well. U.S. Pat. No. 3,920,074 issued Nov. 18, 1975 suggests the use of 0.005 to 0.8 weight percent of the same silicate material. It is further suggested that the composition be injected at the rate of about 0.1 to 10 barrels/foot of vertical formation thickness. These patents teach the use of the composition to reduce oil saturation in the formation and, in conjunction with an agent such as calcium chloride which reacts with the silicate material, to form plugging precipitates as part of an oil recovery process. In the various patents, the aqueous solution of the silicate may be injected alone or as an ingredient of an emulsion. In some patents the aqueous silicate solution is followed by a water drive. In all instances the aqueous silicate solution is used in slugs having a relatively small volume.

While these processes have utility in recovering additional quantities of oil from subterranean petroleum reservoirs, nevertheless, it is desirable to even further increase the amount of oil recoverable from these reservoirs.

Accordingly, a principal object of this invention is to provide an improved process for enhanced oil recovery from a subterranean reservoir.

Another object of the invention is to provide an improved process for enhanced oil recovery from a heterogeneous subterranean formation.

A further object of the invention is to provide such a process wherein channeling of the injected enhanced recovery fluid is reduced.

A still further object of the invention is to provide such a process which is especially suitable for recovering oil having a relatively high acid number.

Yet another object is to provide such a process wherein a preflush is injected to remove divalent cations from the portion of the reservoir to be contacted by the enhanced recovery fluid.

Other objects, advantages and features will be apparent from the following description.

SUMMARY OF THE INVENTION

Briefly, this invention contemplates a process for the enhanced recovery of oil from a subterranean reservoir wherein there is injected into the reservoir through one or more injection wells a relatively large slug of a dilute aqueous alkali metal silicate solution comprising about 0.1 to about 1 reservoir pore volume, preferably about 0.15 to about 0.4 reservoir pore volume, and oil is recovered from spaced production wells. The silicate solution can make up the entire drive fluid or can be followed by a drive fluid.

A preferred procedure for heterogeneous reservoirs includes injection of one or more relatively small slugs of the silicate solution alternately with one or more relatively small slugs of a dilute aqueous solution of an agent that reacts with the silicate to form a gelatinous precipitate, followed by a relatively large slug of the silicate solution. A small slug of water is injected between successive slugs of the reactant solutions as a spacer to separate the reactants during injection.

A still more preferred procedure includes injection of about 0.1 to about 1 reservoir pore volume of a dilute aqueous solution of an alkali metal or ammonium salt selected from the group consisting of chloride, bromide, iodide and nitrate salts and admixtures thereof prior to the injection of the large slug of dilute aqueous alkali metal silicate solution.

DETAILED DESCRIPTION OF THE INVENTION

Figure 1:
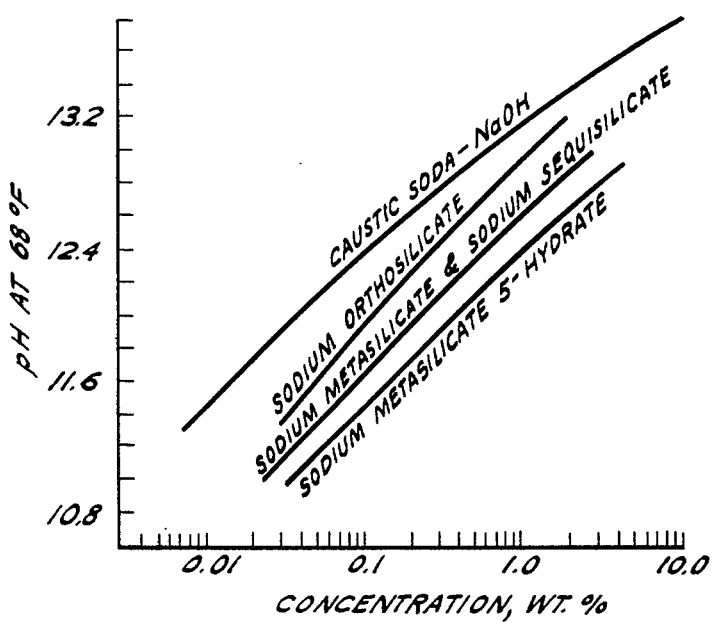
FIG. 1 is a graph illustrating the variation in the pH of aqueous solutions of various alkaline sodium silicates and sodium hydroxide as a function of the concentration of the alkaline material.

According to the present invention, an improved enhanced oil recovery process for recovering oil from subterranean reservoirs involves displacing the oil from the reservoir with a relatively large slug of a dilute aqueous alkali metal silicate solution. This silicate solution may be the only displacment fluid employed or it may be followed by a drive fluid. In heterogeneous formations, it is preferred to interrupt the injection of the large slug of silicate solution after only a small volume thereof has been injected, inject a small slug of a dilute aqueous solution of an agent that reacts with the silicate to form a gelatinous precipitate, which solution is both preceded and followed by a small spacer slug of water, and then resume the injection of the silicate solution. In some instances, it may be desirable to inject more than one small slug of the silicate solution alternately with more than one small slug of the reactant solution, which slugs are separated by a small spacer slug of water.

Crude petroleum is known to contain varying amounts of organic acid materials which react with alkaline materials to form soaps that reduce the interfacial tension between the crude petroleum and water. This reduction in interfacial tension enables solutions containing alkaline materials to more easily displace residual oil from the pores of a reservoir. The petroleum acids found in any particular crude petroleum can include various carboxylic acids and phenolic acids. Saponification of these acids form surface active agents that reduce the interfacial tension between the crude petroleum and water. The amount of these saponifiable materials in a crude petroleum and their effect upon the surface active properties of the system can be characterized by the acid number of crude petroleum. The acid number is defined as the number of milligrams of potassium hydroxide required to neutralize the acid in one gram of sample. The method of this invention is particularly applicable to the recovery of crude petroleum that has sufficient quantity of naturally occurring organic acids to exhibit an interfacial tension with water at a high pH of 0.1 dyne/cm or less. A crude oil having an acid number of greater than about 0.1, preferably about 0.2 to about 10, generally gives these low interfacial tensions.

Also, it is well known that high viscosity crude petroleum is less amenable to recovery by waterflooding than the lower viscosity oils. While the method of this invention can be efficaciously employed to recover low viscosity crude petroleum, it has particular application in the recovery of crude petroleum exhibiting a viscosity above that of the flood water under reservoir conditions of temperature and pressure, and more particularly above about 5 centipoises at reservoir conditions.

The method of this invention can be adapted for recovery of oil from heterogeneous reservoirs. As most petroleum reservoirs exhibit some heterogeneity, the overall recovery efficiency of the displacement process is improved in most naturally occurring petroleum reservoirs by treatment with the process of this invention. By heterogeneity, it is meant that the reservoir is comprised of stratified layers of varying permeability, or that it contains fractures, cracks, fissures, streaks, vuggs, or zones of varying permeability that cause an injected flooding medium to advance through the reservoir nonuniformly. Thus, the formations that are particularly amenable to treatment by the method of this invention are those formations that have strata or zones of different permeabilities, and particularly formations having strata varying more than about 50 millidarcies in permeability or which are otherwise structurally faulted to the extent that the injected flooding media does not advance through the formation at a substantially uniform rate along the entire flood front, but which instead are susceptible to channeling of the flood water to the producing well.

Figure 2:
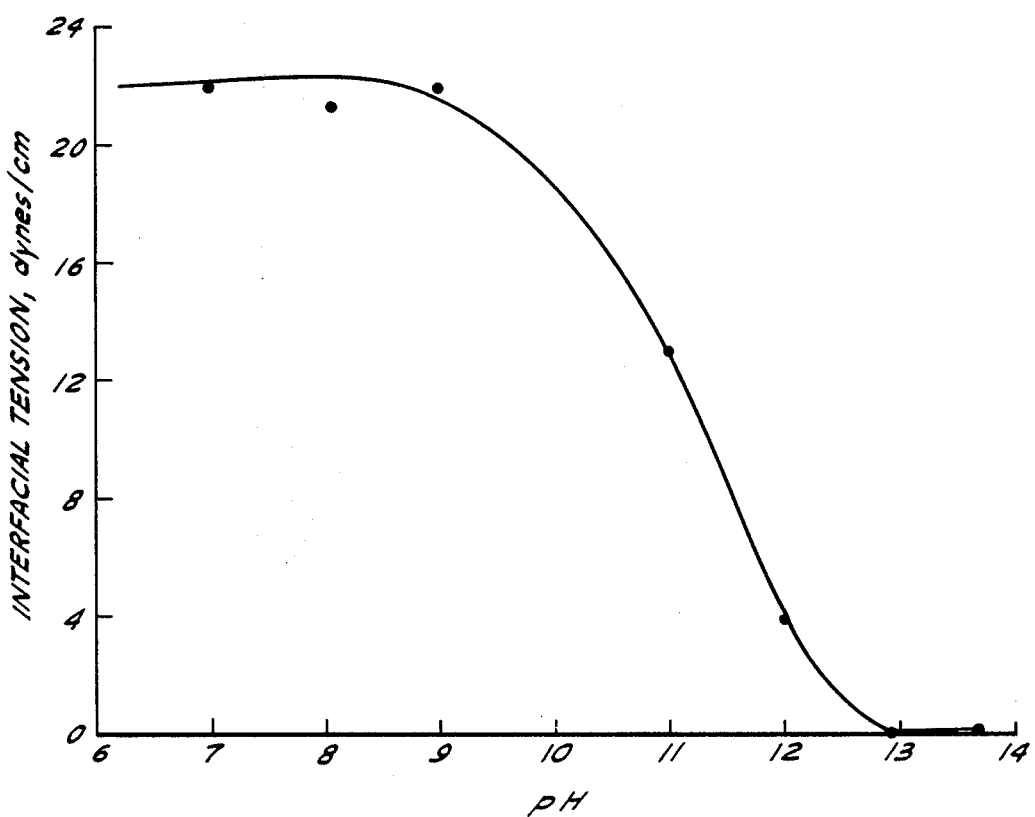
FIG. 2 is a graph illustrating the variation in the interfacial tension of a particular crude oil as a function of pH.

The alkaline alkali metal silicate employed in the practice of this invention for injection into the reservoir is an alkali metal silicate having a molar ratio of $M_2O/SiO_2$ of 1 and above, particularly from about 1 to about 4 and most preferably from about 1.5 to about 2.5 wherein M is an alkali metal atom, such as sodium, potassium, lithium, cesium and rubidium, exemplary of which are alkali metal orthosilicate, alkali metal metasilicate, alkali metasilicate pentahydrate, and alkali metal sequisilicate. Particular agents useful in the practice of the invention include sodium and potassium orthosilicate, sodium and potassium metasilicate, sodium and potassium metasilicate pentahydrate, and sodium and potassium sequisilicate. The pH of aqueous solutions containing various concentrations of alkaline sodium silicates generally provide lower pH solutions than equal weight concentration solutions of sodium hydroxide, but nevertheless, provide high pH solutions in reducing the interfacial tension of many crude petroleum-water systems. The reductions in interfacial tension between the silicate solution and a Texas crude oil are shown in FIG. 2. Sodium orthosilicate is a particularly preferred alkaline alkali metal silicate because of its relatively high pH and correspondingly low interfacial tension with crude oils containing natural organic acids.

With most crude oils containing a significant quantity of saponifiable materials, i.e., those having an acid number of about 0.1 to about 10, significant oil recovery can be achieved by use of an aqueous solution containing about 0.1 to about 2 weight percent of alkaline alkali metal silicate. Preferably an aqueous solution containing about 0.5 to 1.5 weight percent alkaline alkali metal silicate is employed.

The alkaline alkali metal silicates used in the practice of this invention are available in solid form, and the respective alkaline alkali metal silicate solutions can be prepared by dissolving an appropriate quantity of the alkaline alkali metal silicate in water. However, in many cases it is more convenient and less costly to prepare the alkaline alkali metal silicate by adding caustic to an aqueous solution of a low-alkalinity alkali metal silicate having a $M_2O/SiO_2$ ratio of less than 1.

Where the aqueous solution of alkali metal silicate is followed by drive fluid, conventional flooding agents may be used in a conventional manner. Accordingly, the flooding medium can be water, brine, or a dilute aqueous solution of a water-soluble polymer exhibiting a viscosity greater than that of the water or brine; the flooding medium being injected through one or more injection wells to displace oil towards one or more spaced production wells. A number of water-soluble polymers are known to decrease the mobility of water in porous media when dissolved therein in relatively dilute concentrations. Water-soluble polymeric materials that can be employed are relatively high molecular weight acrylic acid-acrylamide copolymers, acrylic acid-acrylamide-diacetone acrylamide terpolymers, partially hydrolyzed polyacrylamides, hydroxyethyl cellulose, carboxymethyl cellulose, polyacrylamides, polyoxyethylenes, modified starches, heteropolysaccharide obtained by the fermentation of starch derived sugar, polyvinyl alcohol, polyvinyl pyrollidone, and polystyrene sulfonates.

In treating the more heterogeneous reservoirs, it is preferred to plug or greatly reduce the flow in the more permeable portions of the reservoir during the treatment so that subsequently injected silicate solution enters the less permeable portions of the reservoir to displace oil which might otherwise be bypassed by the enhanced recovery fluids. A wide variety of reagents can be employed to react with the alkaline alkali metal silicate to form the plug or mobility adjusting precipitate, inclusive of which are acids and acid precursors such as chlorine, sulfur dioxide, sulfur trioxide; water-soluble salts of bivalent metals such as the halide and nitrate salts of iron, aluminum, calcium, cobalt, nickel, copper, mercury, silver, lead, chromium, zinc, cadmium and magnesium; and water-soluble ammonium salts. A preferred agent for reaction with the alkaline alkali metal silicate is calcium chloride.

Preferably, approximately the same volumetric quantities of each aqueous reactant solution are injected in each injection cycle, with the concentration of the water-soluble agent that reacts with the alkaline alkali metal silicate being adjusted to provide sufficient agent to stoichiometrically react with the silicate. The reactant solutions can be separated by injection of a small slug of water between sequentially injected slugs.

In carrying out the plugging treatment, each small slug of reactant solution is injected at conventional flood water injection rates such as rates of about 100 to 2,000 barrels per day for a period of about 1 hour to about 7 days, and preferably for a period of about 4 hours to 1 day. The water slug injected intermediate the slugs of reactive solutions can be injected in smaller volume. The following is a typical injection cycle:

| Slug | Time Broad Range | Preferred Range |
|---|---|---|
| Alkaline alkali metal silicate solution | 1 hour to 7 days | 4 hours to 1 day |
| Water | 1 hour to 1 day | 1 to 8 hours |
| Aqueous solution of reactant | 1 hour to 7 days | 4 hours to 1 day |
| water | 1 hour to 1 day | 1 to 8 hours |

A single injection cycle can be employed, or the injection cycle can be repeated to provide a plurality of treatments.

It has been found in some instances that the injection pressure increases during the alkaline alkali metal silicate solution injection step, and then decreases to its original value during the remaining injection steps of that cycle, rising again upon the next injection of alkaline alkali metal silicate solution. Thus, in some instances the slug injection times must be sufficiently short to prevent excessive injection pressures.

In a preferred mode of practicing the invention to recover oil from a subterranean reservoir, an aqueous solution of sodium orthosilicate is prepared having a sodium orthosilicate concentration selected to provide a pH sufficient to reduce the interfacial tension of a selected oil-water system to less than 0.1 dyne/cm, and preferably to a value of less than 0.01 dyne/cm. The sodium orthosilicate solution is injected into the reservoir through an injection well for a period of time until about 0.15 to about 0.4 pore volume of solution has been injected. Flood water or brine is then injected to drive the silicate solution through the reservoir. In another mode of practicing the invention, injection of the relatively large slug of silicate solution is preceded by one or more of the typical injection cycles shown above wherein a plug or mobility adjusting precipitate is formed. This typical injection cycle could be repeated later in the flooding operation if severe fluid channeling of injected fluid to the producing well occurs. The oil and other produced fluids are recovered from a spaced production well. While the alkaline silicate solution treatment is normally followed by conventional water drive, it has been found in some instances that the subsequently injected flood water soon breaks through to the producing wells. Hence, it may be necessary to maintain the alkaline silicate solution injection for substantially the entire recovery operation.

In another preferred mode of practicing the invention, there is prepared an aqueous solution containing about 1 to about 5 percent by weight, preferably 1.0–2.0 percent by weight, of an alkali metal or ammonium salt selected from the group consisting of chloride, bromide, iodide and nitrate salts and admixtures thereof. About 0.1 to about 1 reservoir pore volume, preferably 0.2 to 0.4 reservoir pore volume, of this solution is injected as a preflush into the reservoir prior to the injection of the large slug of aqueous alkaline alkali metal silicate solution to assist in removing divalent cations from the portions of the reservoir to be contacted by the silicate solution.

While the reason for the effectiveness of the process employing this preflush is not completely understood, it is believed that many reservoirs contain divalent cations which are either in solution in the reservoir fluids or are adhering to the reservoir rock. These divalent cations tend to react with any injected silicate with which they come in contact and reduce the oil recovery efficiency of the silicate solution. In order to prevent the injected silicate solutions from being depleted of silicate, it is desired to remove these divalent cations from the portions of the reservoir which will be contacted by the silicate solution. Flushing the reservoir with water does not effectively remove the divalent cations. This may be because the divalent cations tend to cling strongly to the reservoir rock and resist removal by any water which flows past. However, by using a preflush comprising an aqueous solution of the aforementioned alkali metal or ammonium salts, a more effective removal of the divalent cations is achieved, possibly by an ion exchange mechanism wherein the divalent cations previously in the reservoir are exchanged for the alkali metal or ammonium cations of the injected aqueous solution. The preflush solution thus solubilizes the divalent cations which are carried on out into the reservoir as part of the preflush solution. Subsequently, injected aqueous silicate solution passes through the reservoir without contacting appreciable quantities of the divalent cations. The silicate does not precipitate upon contacting either alkali metal or ammonium cations. Divalent cations removed are calcium, magnesium, beryllium, strontium and barium. Alkali metal cations which can be used in the preflush solution are sodium, potassium, lithium, rubidium and cesium.

This invention is further illustrated by the following examples which are illustrative of specific modes of practicing the invention and are not intended as limiting the scope of the invention as defined by the appended claims.

EXAMPLES 1 to 3

A 2 inch square by 4 foot long Dundee sandstone test core is first saturated with a synthetic brine containing 7.5 weight percent sodium chloride, 1.5 weight percent calcium chloride and 0.4 weight percent magnesium chloride, and then with a Texas crude oil having an acid number of 1.1. The interfacial tension of this crude oil as a function of pH is shown in FIG. 2. The core is then flooded with the same synthetic brine to residual oil saturation. Various flooding operations are then carried out wherein, as part of the operations, various amounts of an aqueous solution containing 0.5 weight percent of sodium orthosilicate marketed by the Philadelphia Quartz Company under the trademark Metzo 200 are injected. The flooding operation is completed by injecting fresh water to residual oil saturation. The produced fluids are recovered and the oil recovery determined In Example 1, a relatively small slug, 0.1 pore volume, of the sodium orthosilicate solution is used as taught by the prior art. In Example 2, there is used a relatively large total volume of injected fluids, 0.5 pore volume, made up of alternate slugs of 0.01 pore volume sodium orthosilicate solution followed by 0.01 pore volume of an aqueous solution containing 0.035 weight percent of calcium chloride. This procedure is also taught by the prior art. In Example 3, a relatively large slug, 0.5 pore volume, of the sodium orthosilicate solution is injected as taught by this invention. The results of these tests are summarized in Table 1.

TABLE 1

|  | Example Number | | |
|---|---|---|---|
|  | 1 | 2 | 3 |
| Slug size, pore volume | 0.1* | 0.5** | 0.5*** |
| Oil recovery, % residual oil | 0 | 0 | 16 |

*Aqueous solution containing 1.0 weight percent of sodium orthosilicate.
**Alternate slugs of 0.01 pore volume of an aqueous solution containing 0.5 weight percent of sodium orthosilicate and 0.01 pore volume of an aqueous solution containing 0.035 weight percent of calcium chloride.
***Aqueous solution containing 0.5 weight percent of sodium orthosilicate.

EXAMPLES 4 to 7

A 1.5 inch square by 4 foot long Berea sandstone test core is saturated with synthetic brine, then with crude oil and then flooded with synthetic brine to residual oil saturation as described above using crude oils having various acid numbers. A slug of aqueous Metzo 200, sodium orthosilicate, solution is injected into the test core followed by fresh water to residual oil saturation. The produced fluids are recovered and the oil recovery determined.

TABLE 2

|  | Example Number | | | |
|---|---|---|---|---|
|  | 4 | 5 | 6 | 7 |
| Crude oil used | Texas | Oklahoma | Kansas | Kansas |
| Acid number of crude oil | 1.1 | 0.11 | 0.05 | 0.05 |
| Concentration Metzo 200 in aqueous solution (weight %) | 0.5 | 0.3 | 0.3 | 0.8 |
| Slug size, pore volume | 0.4 | 3.0 | 10 | 10 |
| Oil recovery % residual oil | 18 | 2 | 0 | 0 |

It is apparent from these examples that oil recovery is greatly affected by the acid number of the crude oil.

EXAMPLE 8

The lateral surface of a 2 inch square by 4 foot long Berea sandstone test core is coated with plastic to permit linear fluid flow through the core from one end to the other. First, the core is flooded with a 9.4 percent by weight total solids brine containing 15,250 p.p.m. of calcium chloride and 2,000 p.p.m. of magnesium chloride. Next, the core is flooded with the same Texas crude oil used in Example 4 above having an acid number of 1.1. Crude oil is flooded through the core until brine production stops. The core is then flooded with the above-described brine until crude oil production stops. At this point, the core is considered to be at residual oil saturation. The core contains 0.34 reservoir pore volume residual oil in place. A 0.15 pore volume slug of an aqueous solution containing 0.5 percent by weight Metzo 200 sodium orthosilicate is injected into the core followed by fresh water to residual oil saturation. The produced fluids are recovered and the oil recovery determined. No additional oil is recovered by this procedure.

EXAMPLE 9

The procedure of Example 8 is repeated with the following differences. Before injection of the recovery fluids, the core contains 0.35 reservoir pore volume residual oil in place. Prior to the injection of the aqueous Metzo 200 sodium orthosilicate solution, a preflush of 1 pore volume of a 2 percent by weight aqueous solution of sodium chloride is injected through the core. In this instance the additional oil recovery amounts to 22.8 percent of the residual oil in place.

A comparison of Examples 8 and 9 shows the value of the use of the preflush solution.

Various embodiments and modifications of this invention have been described in the foregoing description and examples, and further modifications will be apparent to those skilled in the art. Such modifications are included within the scope of this invention as defined by the following claims.

Having now described the invention, I claim:

1. A process for the enhanced recovery of oil from a subterranean reservoir penetrated by at least one injection well and at least one production well spaced therefrom which comprises injecting through an injection well and into said reservoir about 0.1 to about 1 reservoir pore volume of a dilute aqueous solution of alkaline alkali metal silicate having a molar ratio of $M_2O/SiO_2$ of 1 or above wherein M is an alkali metal atom, which aqueous solution of alkaline alkali metal silicate reduces the interfacial tension of said oil with water at high pH to about 0.1 dyne/cm or less, and recovering oil at the production well.

2. The process defined in claim 1 wherein said oil has an acid number of greater than about 0.1.

3. The process defined in claim 1 wherein from about 0.15 to about 0.4 reservoir pore volume of the dilute aqueous solution of alkaline alkali metal silicate is injected.

4. The process defined in claim 1 wherein the dilute aqueous solution of alkaline alkali metal silicate contains about 0.1 to 2 weight percent alkaline alkali metal silicate.

5. The process defined in claim 1 wherein the alkaline metal silicate is sodium or potassium orthosilicate, sodium or potassium metasilicate, sodium or potassium metasilicate pentahydrate, or potassium sesquisilicate.

6. The process defined in claim 5 wherein the alkaline alkali metal silicate is sodium orthosilicate.

7. The process defined in claim 1 wherein the injection of the dilute aqueous solution of alkali metal silicate is followed by a slug of an aqueous drive fluid.

8. The process defined in claim 7 wherein the aqueous drive fluid is water.

9. A process for the enhanced recovery of oil from a subterranean reservoir penetrated by at least one injection well and at least one production well spaced therefrom which comprises injecting through an injection well and into said reservoir about 0.15 to about 0.4 reservoir pore volume of an aqueous solution containing about 0.1 to 2 weight percent of an alkaline alkali metal silicate having a molar ratio of $M_2O/SiO_2$ of 1 or above wherein M is an alkali metal atom which aqueous solution of alkaline alkali metal silicate reduces the interfacial tension of said oil with water at high pH to about 0.1 dyne/cm or less, and recovering oil at the production well.

10. The process defined in claim 9 wherein said oil has an acid number of greater than about 0.1.

11. The process defined in claim 9 wherein the alkaline metal silicate is sodium or potassium orthosilicate, sodium or potassium metasilicate, sodium or potassium metasilicate pentahydrate, or potassium sesquisilicate.

12. The process defined in claim 11 wherein the alkaline alkali metal silicate is sodium orthosilicate.

13. The process defined in claim 9 wherein the injection of the dilute aqueous solution of alkali metal silicate is followed by a slug of an aqueous drive fluid.

14. The process defined in claim 9 wherein the aqueous drive fluid is water.

15. A process for the enhanced recovery of oil from a subterranean reservoir penetrated by at least one injection well and at least one production well spaced therefrom which comprises sequentially injecting through an injection well and into said reservoir:
 (a) about 0.1 to about 1 reservoir pore volume of an aqueous solution of an alkali metal or ammonium salt selected from the group consisting of chloride, bromide, iodide and nitrate salts and admixtures thereof, and
 (b) about 0.1 to about 1 reservoir pore volume of a dilute aqueous solution of alkaline alkali metal silicate having a molar ratio of $M_2O/SiO_2$ of 1 or above wherein M is an alkali metal atom, which aqueous solution of alkaline alkali metal silicate reduces the interfacial tension of said oil with water at high pH to about 0.1 dyne/cm or less, and recovering oil at the production well.

16. The process defined in claim 15 wherein said aqueous solution of salt contains about 1 to about 5 percent by weight alkali metal or ammonium salt selected from the group consisting of chloride, bromide, iodide and nitrate salts and admixtures thereof.

17. The process defined in claim 15 wherein the aqueous solution of salt contains about 1 to about 5 percent by weight of sodium chloride.

18. A process for the enhanced recovery of oil from a heterogeneous subterranean reservoir penetrated by at least one injection well and at least one production well spaced therefrom which comprises:
 (a) alternately injecting small slugs of:
  (1) a dilute aqueous solution of an alkaline alkali metal silicate having a molar ratio of $M_2O/SiO_2$ or above wherein M is an alkali metal atom which aqueous solution of alkaline alkali metal silicate reduces the interfacial tension of said oil with water at high pH to about 0.1 dyne/cm or less;
  (2) water;
  (3) a dilute aqueous solution of a water-soluble material that reacts with the alkali metal silicate to form a precipitate;
  (4) water; and
 (b) injecting through the injection well about 0.1 to about 1 reservoir pore volume of an aqueous solution of an alkali metal or ammonium salt selected from the group consisting of chloride, bromide, iodide and nitrate salts and admixtures thereof,
 (c) injecting about 0.1 to about 1 reservoir pore volume of a dilute aqueous solution of said alkaline alkali metal silicate.

19. The process defined in claim 18 wherein said aqueous solution of salt contains about 1 to about 5 percent by weight alkali metal or ammonium salt selected from the group consisting of chloride, bromide, iodide and nitrate salts and admixtures thereof.

20. The process defined in claim 18 wherein the aqueous solution of salt contains about 1 to about 5 percent by weight of sodium chloride.

* * * * *